United States Patent Office 3,046,290
Patented July 24, 1962

---

3,046,290
MANUFACTURE OF ALKYL ALUMINUM HYDRIDES
Harold E. Podall, Baton Rouge, La., assignor to Ethyl Corporation, New York, N.Y., a corporation of Delaware
No Drawing. Filed Aug. 22, 1960, Ser. No. 50,823
5 Claims. (Cl. 260—448)

This invention relates to the manufacture of alkyl aluminum compounds. More particularly, the invention relates to the production of dialkyl aluminum hydride compounds by the reaction of trialkyl aluminum compounds with hydrogen under elevated pressure and temperature.

The alkyl aluminum compounds are well known materials suitable for components of catalysts for the polymerization of olefin hydrocarbons into macromolecular solid polymers, as strong reducing agents for reducing various organic or inorganic compounds, and for other purposes. The dialkyl aluminum hydrides are similarly known, and in fact, for many purposes the dialkyl aluminum hydride compounds are preferred or have particular properties which render them more effective for specific operations. Dialkyl aluminum hydrides are also particularly suitable for the synthesis of explicit trialkyl aluminum compounds, wherein one of the alkyl substituents is different than the other two alkyl groups, and in fact, the addition of a particular olefin to a dialkyl aluminum hydride is the only known effective route whereby alkyl compounds of aluminum having such selected different alkyl substituents can be synthesized in high purity and with good yields.

It is known that the trialkyl compounds of aluminum can be treated with hydrogen under elevated pressure and the treatment will result in the reaction:

$$R_3Al + H_2 \rightarrow R_2AlH + HR$$

wherein R is an alkyl radical. This reaction is disclosed in Belgian Patent 555,080 by Karl Ziegler. Although the reaction has been found to occur, the reaction has not been effectively utilized as a process because conversion is low and instead of obtaining a pure dialkyl aluminum hydride, only partial conversion is obtained and the product mixture includes the trialkyl aluminum compound as well as the desired dialkyl aluminum hydride. It is difficult to separate the dialkyl aluminum hydride product from the trialkyl aluminum feed material, because of dimerization of these two components, or internal complexing one with the other. In addition, as will be illustrated hereinafter, the reaction is very slow in operation and thus does not afford an economical route. A need thus has existed for a convenient and effective process for the rapid and effective or high conversion of trialkyl aluminum to corresponding dialkyl aluminum hydrides.

An object of the present invention accordingly is to provide a new and improved process for the hydrogenolysis of trialkyl aluminum compounds to yield in good purity and at a rapid rate a corresponding dialkyl aluminum hydride. An additional object is to provide a process for the preparation of dialkyl aluminum hydrides which is not complicated by the necessity of difficult fractionation of the dialkyl aluminum hydride from the trialkyl aluminum compound from which it is derived. Other objects will appear hereinafter.

According to the present invention a trialkyl aluminum compound, such as trimethyl aluminum, triethyl aluminum, tri-n-propyl aluminum, tri-isobutyl aluminum, tri-octyl aluminum, and others, is reacted with hydrogen at elevated pressure and temperature and in the presence of a catalytic adjuvant or accelerator material comprising magnesium metal. The treatment is continued until conversion is virtually complete, in most instances, and the desired dialkyl aluminum hydride produced can be isolated in suitable pure form by a straightforward sedimentation or filtering operation. In certain instances, it will be desirable to flash distill the desired dialkyl aluminum hydride from the reaction product mixtures. In other instances, a fractionation of the product, to remove alkane hydrocarbon by-product, is required.

The conditions of operation are quite flexible, and involve moderately elevated temperatures and elevated pressures. While not critical, a highly preferred temperature range is from about 100 to 200° C. or above, and an even more preferred range is from about 125 to 175° C. As to the pressure employed for the reaction, a hydrogen or reaction pressure of typically, from about 500 to 5,000 pounds per square inch is suitable, a preferred range of pressures being from 2,000 to 4,000 pounds per square inch. Generally, it is found that the more elevated temperatures result in more rapid reaction and facilitate the completion of the reaction, particularly in cyclic operations approaching the end of a reaction period at which time the concentration of the trialkyl aluminum feed is low. The magnesium employed as an adjuvant can be present in any of a substantial range of concentration. It will be realized, that, in batch or cyclic operations, that the concentration of the magnesium with respect to the trialkyl aluminum, will vary according to the course of reaction. Generally, suitable proportions of the magnesium are from about 0.1 to 2 parts by weight per part of aluminum in the initially present trialkyl aluminum. The magnesium should be in subdivided form, and as a matter of fact, the greater degree of subdivision provides a greater degree of effectiveness for the magnesium employed.

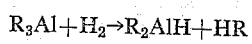

The variations of the process and details of the preferred manner of carrying out the process will be clear from the working examples given hereinafter and the detailed description below.

*Example I*

In this operation, triethyl aluminum and pure subdivided magnesium were charged to an autoclave in the proportions of about 29 parts of the magnesium per 100 parts of the triethyl aluminum, this corresponding to a ratio of about 1.24 parts of magnesium by weight per part of aluminum content of the triethyl aluminum. The magnesium was prepared as freshly subdivided material by the apparatus described in Shaw patent, U.S. 2,416,717, being formed under an inert fluid. The autoclave was sealed, and hydrogen pressure was applied at 2900 pounds per square inch, while heating the autoclave at 150° C. and providing intimate agitation by oscillation of the autoclave. Reaction occurred promptly and readily as shown by hydrogen take-up. The pressure and reaction conditions were maintained as indicated for a period of 5.5 hours at which time the reaction appeared to be complete as evidenced by termination of hydrogen up-take. The excess hydrogen pressure, and by-product ethane, were vented, and the autoclave and contents cooled to ambient temperature. The reaction product mixture was removed from the autoclave, and dissolved in dry hexane, for facilitating separation of the unchanged magnesium particles by filtration. Analysis of an aliquot portion of the filtrate showed a complete conversion of the triethyl aluminum to diethyl aluminum hydride, as determined by ultraviolet spectrophotometric analysis.

By way of contrast, illustrating the benefits of the operation as in the above example, when triethyl aluminum was subjected to reaction with hydrogen at higher pressures of the order of 3,000-5,000 pounds per square inch, and at comparable temperatures, reaction periods of 16 and 24 hours were required, and conversion of the triethyl aluminum was only of the order of about ⅔ to ¾. Accordingly, it is clear that the operation, as in the above Example I, according to the present invention, results in at least a three-fold and higher increase in reaction rate, and also provides virtually complete conversion of the triethyl aluminum in a reasonable time.

*Example II*

In this operation, the reactor charge included about 180 parts by weight of magnesium particles and 260 parts of trimethyl aluminum. The reaction is carried out at a hydrogen pressure of about 3,500 pounds per square inch, and a temperature of 150° C. Upon completion of the reaction, the trimethyl aluminum is virtually completely converted to dimethyl aluminum hydride, $(CH_3)_2AlH$.

When this operation is repeated, but instead of using magnesium powder prepared as for the preceding examples, subdivided magnesium powder, ground under an inert atmosphere, and passing a 20 mesh screen and retained on a 35 mesh screen, is used, it can be employed in proportions of only about 90 parts per 260 parts of the trimethyl aluminum.

The examples tabulated below illustrate further the variations and scope of the various embodiments of the process.

separation of the magnesium metal catalyst from the resultant product is more difficult with decreasing particles sizes, such lower proportions are not highly preferred. Generally, there is no significant benefit achieved in employing proportions appreciably above one part by weight per part of aluminum in the trialkyl aluminum feed stock, but greater proportions are not adverse to the process.

The product of the reaction, particularly in the case of the lower molecular weight dialkyl aluminum hydride products, can be readily separated from the solid residues or solid magnesium catalysts material by fractionation or by distillation. As the average alkyl group of the dialkyl aluminum hydride product increases in chain length, lower pressures are required, to permit an efficient vaporization separation. Alternatively, instead of the vaporization recovery or work-up operation, a mechanical separation of the solid magnesium catalyst remaining at the end of a reaction is eminently feasible. This may be a sedimentation following by filtration of the liquid phase, or a simple filtration operation. The magnesium thus isolated from a reaction product mixture is available and suitable for recycling for additional catalytic purposes.

In carrying out the process, since the hydrogenolysis operation is accompanied by the formation of an alkane

| Example | Trialkyl aluminum feed, $R_3Al$ | Magnesium catalyst | | Operating pressure, p.s.i. | Operating temperature, ° C. | Product |
|---|---|---|---|---|---|---|
| | | Form | Proportions, parts/part aluminum in $R_3Al$ | | | |
| III | Triisobutyl aluminum | Milled powder | 0.5:1 | 650 | 125 | Di-isobutyl aluminum hydride. |
| IV | Tri-n-propyl aluminum | Powder 20-35 mesh | 0.7:1 | 4,800 | 190 | Di-n-propyl aluminum hydride. |
| V | Tri-n-octyl aluminum | Powder 35-100 mesh | 0.3:1 | 3,500 | 110 | Di-n-octyl aluminum hydride. |
| VI | Tri-n-hexyl aluminum | Small spheres, avg. ¹⁄₆₄ in. diameter | 0.3:1 | 2,200 | 160 | Di-n-hexyl aluminum hydride. |
| VII | Tri-n-dodecyl aluminum | Flakes 20-100 mesh | 0.15:1 | 700 | 160 | Di-n-dodecyl aluminum hydride. |

In the foregoing examples, a more rapid and complete conversion of the trialkyl aluminum to the corresponding dialkyl aluminum hydride is achieved by use of the magnesium catalyst. From the examples, it will be apparent that the process of the present invention is applicable to a substantial variety of trialkyl aluminum compounds as feed materials to be converted to the corresponding dialkyl aluminum hydride, and that considerable variation in the conditions of operation are permissive.

As already indicated, the magnesium may be in any of a variety of comminuted forms, such as ground magnesium flakes, small pellets or spherical particles, turnings, or flitters. As clear from certain of the examples above, one highly effective mode of providing the magnesium in appropriate comminuted form is to employ the milling type comminuting technique, such as, for example, is described in Shaw Patent 2,416,717. When magnesium is comminuted from a gross solid state by such apparatus, and particularly under an inert atmosphere, it is highly effective for the purposes of the present invention. However, the precise form of the magnesium is not sacramental, and other commercially available subdivided forms are similarly effective.

The actual weight proportions of the magnesium metal provided can be extremely low, particularly when the relatively high surface forms of magnesium comminuted metal are employed. As already indicated, the proportions can be as low as 0.1 part by weight per part of aluminum in the initially present trialkyl aluminum. In fact, in many cases concentrations of even below this level are entirely appropriate, for example, down to several hundredths parts by weight per part of aluminum. When such low proportions are provided, however, it is desirable to employ a particularly highly comminuted magnesium to provide the appropriate degree of surface, and since the hydrocarbon corresponding to the alkyl group removed from the trialkyl aluminum compound, provision is necessarily made for occasional venting of the reaction chamber, to permit removal of the alkane hydrocarbon from the gas phase space. In the case of the relatively long alkyl trialkyl aluminum hydrocarbons, the resultant alkane hydrocarbon is a liquid at the conditions of operation, and will necessarily be separated from the dialkyl aluminum hydride product desired by a fractionation operation upon discharge of the liquid product phase from the reaction zone.

Having fully described the process of the invention and the best mode of carrying out the invention, what is claimed is as follows:

1. The process of manuafture of a dialkyl aluminum hydride comprising reacting a trialkyl aluminum with hydrogen at elevated pressure and temperature and in the presence of comminuted magnesium metal in the proportions of from about 0.1 to 2 parts by weight to 1 part by weight of the aluminum content of the trialkyl aluminum.

2. The process of manufacture of diethyl aluminum hydride comprising reacting triethyl aluminum with hydrogen at a pressure of from about 500 to 5,000 pounds per square inch and a temperature of from about 100 to 200° C. and in the presence of comminuted magnesium metal in the proportions of from 0.1 to 2 parts by weight to one part by weight of the aluminum content of the triethyl aluminum.

3. The process of manufacture of dimethyl aluminum hydride comprising reacting trimethyl aluminum with hydrogen at a pressure of from about 500 to 5,000 pounds per square inch and a temperature of from about 100 to 200° C. and in the presence of comminuted magnesium metal in the proportions of from 0.1 to 2 parts by weight to one part by weight of the aluminum content of the trimethyl aluminum.

4. The process of manufacture of di-n-propyl aluminum hydride comprising reacting tri-n-propyl aluminum with hydrogen at a pressure of from about 500 to 5,000 pounds per square inch and a temperature of from about 100 to 200° C. and in the presence of subdivided magnesium metal in the proportions of from 0.1 to 2 parts by weight to one part by weight of the aluminum content of the tri-n-propyl aluminum.

5. The process of manufacture of di-isobutyl aluminum hydride comprising reacting triisobutyl aluminum with hydrogen at a pressure of from about 500 to 5,000 pounds per square inch and a temperature of from about 100 to 200° C. and in the presence of comminuted magnesium metal in the proportions of from 0.1 to 2 parts by weight to one part by weight of the aluminum content of the triisobutyl aluminum.

References Cited in the file of this patent

FOREIGN PATENTS 1,181,405    France _____ June 16, 1959